R. S. TROTT.
DRIVING MECHANISM FOR MOTOR VEHICLES.
APPLICATION FILED MAR. 6, 1913.
1,247,745.
Patented Nov. 27, 1917.
4 SHEETS—SHEET 2.
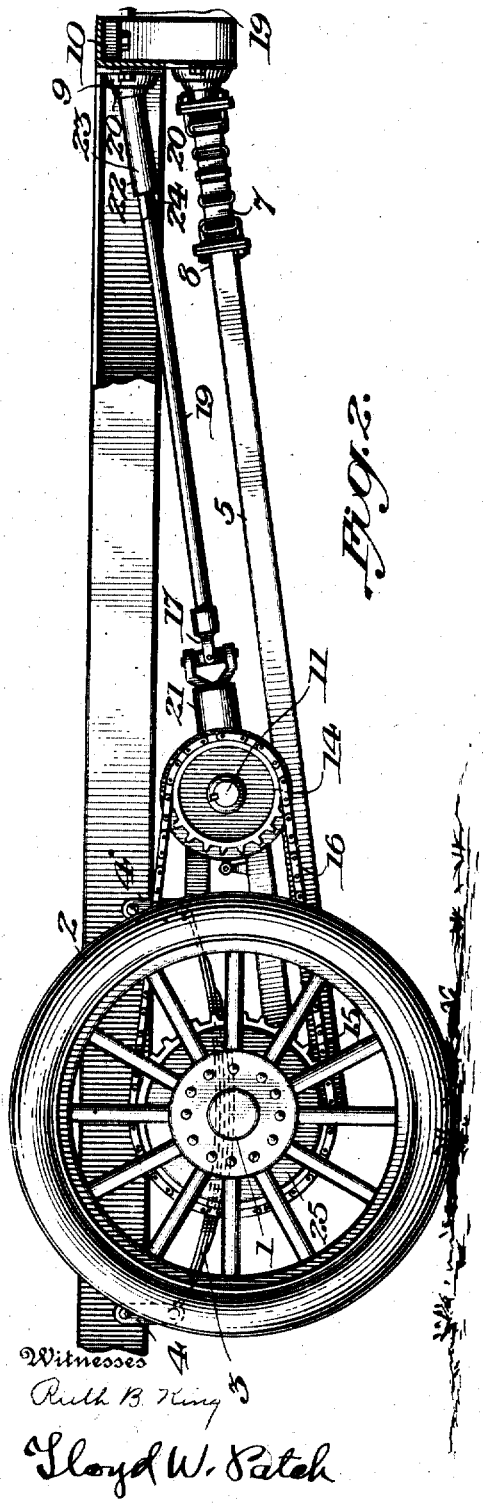
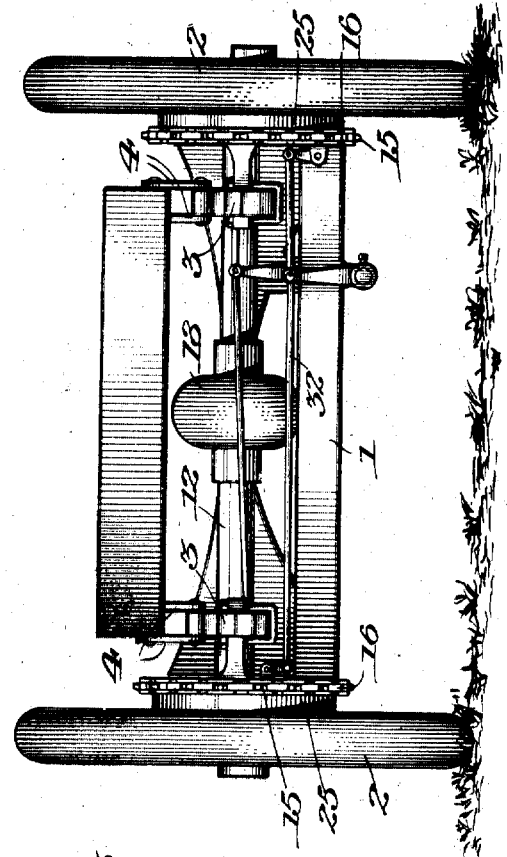

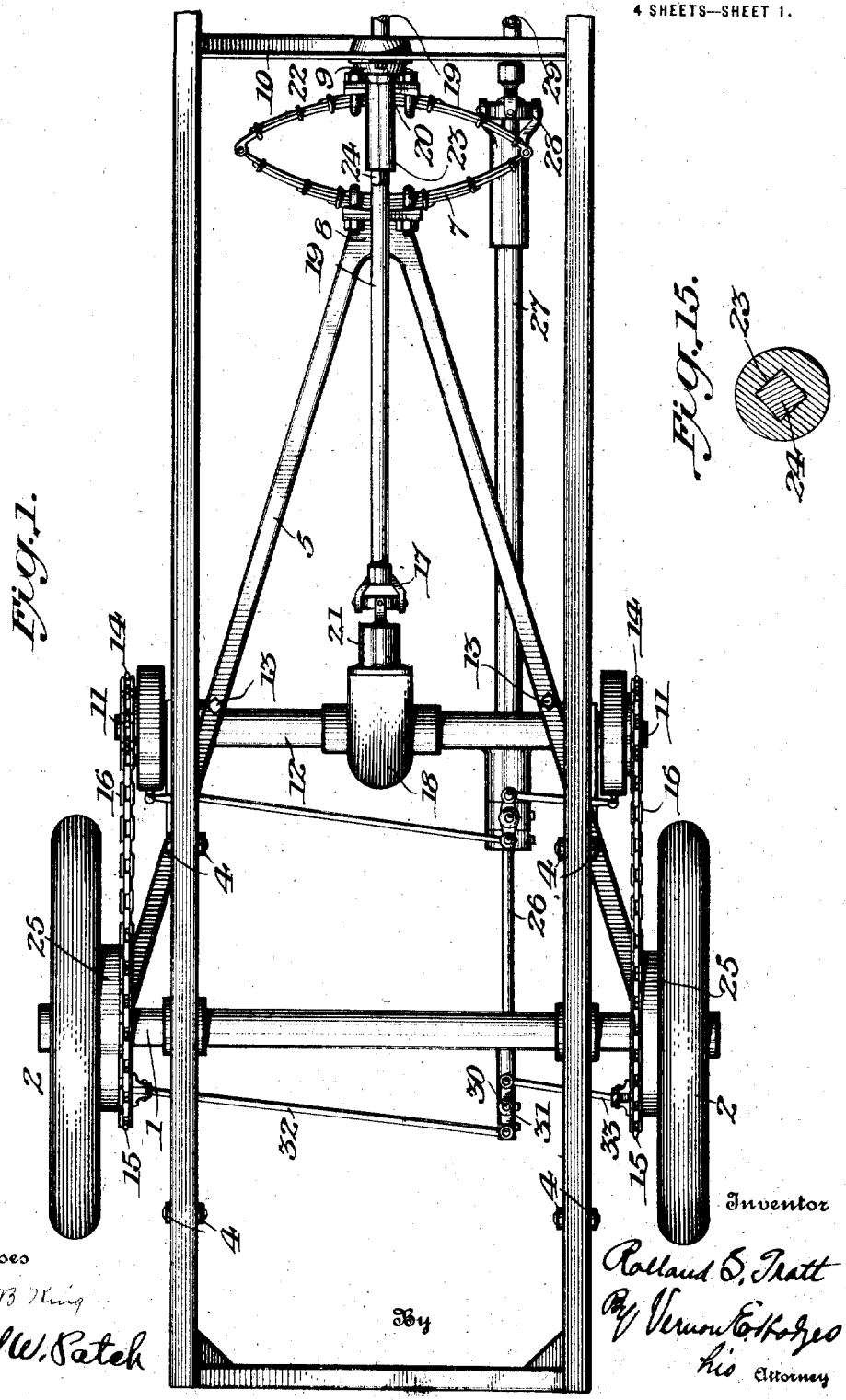

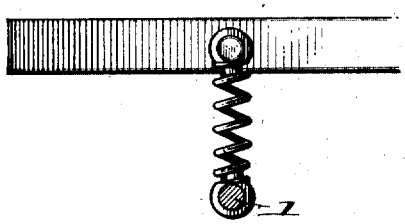
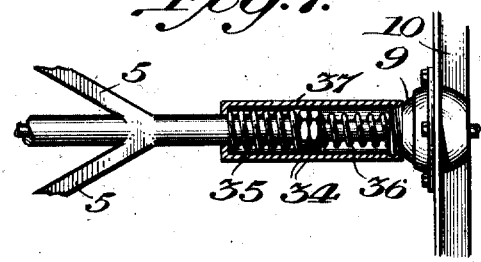
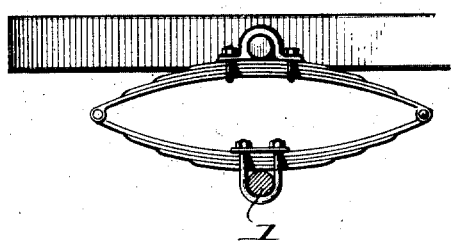
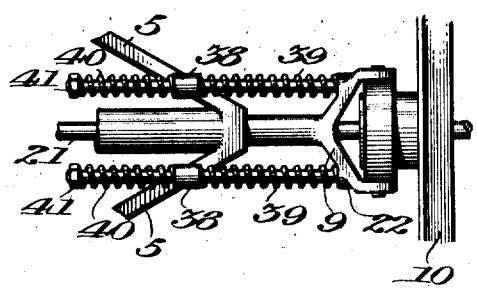
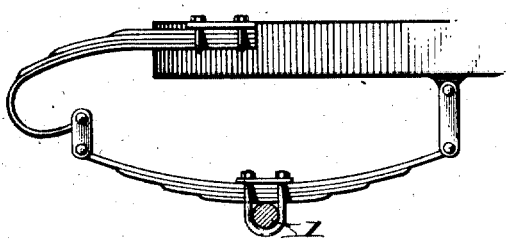
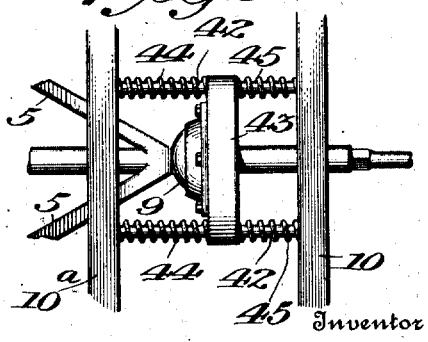

R. S. TROTT.
DRIVING MECHANISM FOR MOTOR VEHICLES.
APPLICATION FILED MAR. 6, 1913.
1,247,745.
Patented Nov. 27, 1917.
4 SHEETS—SHEET 4.
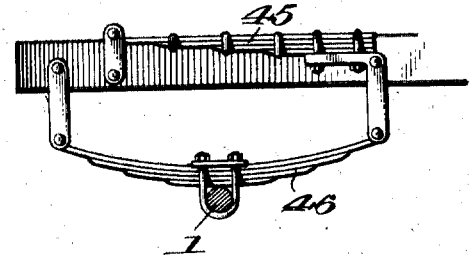
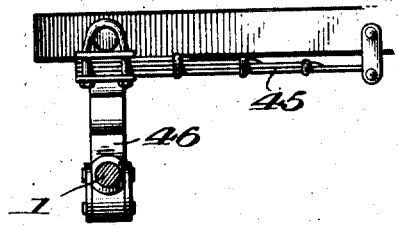
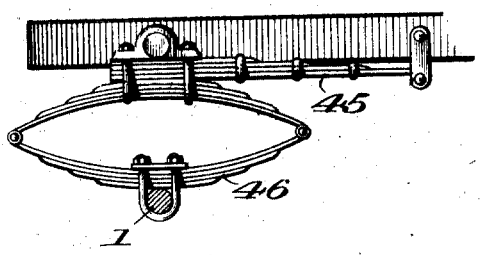
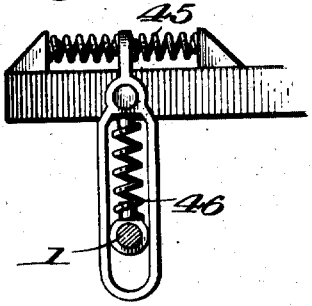
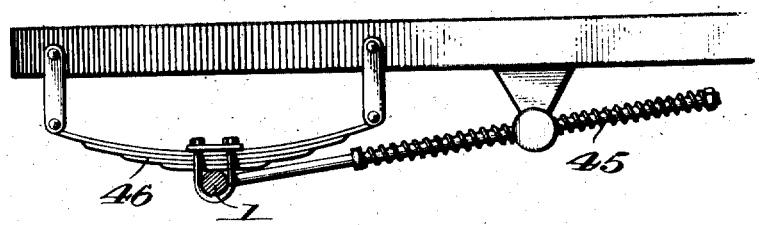

UNITED STATES PATENT OFFICE.

ROLLAND S. TROTT, OF DENVER, COLORADO.

DRIVING MECHANISM FOR MOTOR-VEHICLES.

1,247,745.  Specification of Letters Patent.  Patented Nov. 27, 1917.

Application filed March 6, 1913. Serial No. 752,392.

*To all whom it may concern:*

Be it known that I, ROLLAND S. TROTT, a citizen of the United States, residing at the city and county of Denver and State of Colorado, have invented certain new and useful Improvements in Driving Mechanism for Motor-Vehicles, of which the following is a specification.

My invention relates to an improvement in driving mechanism for motor vehicles and is more particularly applicable to that type of vehicle in which the rear or driven axle is mounted to have resilient movement in a direction parallel with, and to be held approximately at, right angles to the line of draft.

The object is to provide a driving means held upon the reach or brace which maintains the axle in a position at right angles to the line of draft, which driving means is connected to the source of power by an extensible drive shaft.

A further object is in the provision of a construction in which the rear axle is a load supporting but not a driving axle and in which the wheels are mounted to be of the so-called floating type.

This invention consists of certain novel features of construction and combinations of parts which will be hereinafter more fully described and pointed out in the claims.

In the accompanying drawings—

Figure 1 is a top plan view, of the rear portion of a vehicle frame showing my improvement applied thereto;

Fig. 2 is a view in side elevation;

Fig. 3 is a rear end view of the structure disclosed in Figs. 1 and 2;

Figs. 4, 5 and 6 are views of slightly modified forms of load springs which may be used with my structure;

Figs. 7, 8 and 9 show modified forms of endwise shock absorbing springs;

Figs. 10, 11, 12, 13 and 14 show spring structures in which the vertical and endwise shock springs are mounted in connection with each other.

Fig. 15 is an enlarged cross section through the forward telescopic end of the jack shaft drive.

In the forms shown in Figs. 1, 2 and 3, the axle 1 has the wheels 2, 2 revolubly mounted thereon. Vertical shock springs 3, 3 are pivotally connected to the axle and have a pivotal connection with the frame through links 4, 4. A brace or reach 5 is secured to the axle near the extremities thereof. The brace 5 is made preferably V-shaped in plan although it may be of any other configuration which will accomplish the desired result of sustaining the rear axle in a position approximately at right angles to the line of draft.

In the structure disclosed the axle is free to move backwardly and forwardly in a plane parallel with the line of draft and this backward and forward movement is resiliently opposed by a spring 7 which is shown in the present instance as being of the full elliptic type and is secured on its one side to the forward end 8 of the brace and on its opposite side by a universal joint 9 to a cross bar 10 connected with the frame, thus permitting of the pivotal movement of the axle about its point of connection with the frame due to the resiliency of the vertical shock springs 3 and resiliently opposing the backward and forward movement of the axle permitted by the pivotal connection of the springs 3 with the frame.

Jack shafts 11, 11 are mounted to revolve in the casing 12 secured by bolts 13 or in any other suitable manner to the reach 5, thus causing the jack shafts 11 to be carried in the spaced relation with respect to the axle 1 regardless of the movement of the axle caused by the irregularities in the road over which the vehicle is passing. A spur gear 14 is secured to each of the jack shafts 11, and sprocket wheels 15, 15 carried by the wheels 2 are connected with the spur gears 14 by sprocket chains 16, 16.

The main drive shaft 19 is connected to the universal joint 20. The jack shaft drive is made in two sections 21 and 22, the section 21 being connected with the gears in the gear casing 18 for driving the drive shaft, the section 22 connected to the universal joint 20, and the one section having a squared orifice 23 and the other a squared portion 24 which fits slidably into the orifice 23 so that its sections are extensible one within the other and are connected to revolve together when the drive shaft 19 is rotated through their connection with the universal joint 20. The universal joint 20 is preferably contained entirely within the universal joint 9 although other structures may be devised which will overcome the necessity of mounting the several parts in this manner.

The rear wheels may be provided with brakes 25, 25 of standard construction, and as one means of operating the brakes I have disclosed a two-part torsion rod, the parts 26 and 27 of which are connected to be extensible in much the same manner as the sections of the jack shaft drive and this torsion rod is connected by the universal joint 28 to the control shaft 29 connected to the frame and adapted to be revolved for transmitting a turning movement to the torsion rod.

A collar 30 is secured on the rear end of the part 2 of the torsion rod and carries an arm 31 to which are connected the connecting rods 32 and 33 for transmitting a pull and thrust to the brakes 25 for operating them.

Figs. 4, 5 and 6 disclose several commercial types of spring which may be mounted in place of the vertical shock springs disclosed in Figs. 1, 2 and 3, the one essential point with this spring being that it is pivoted at its connection with a frame and leaves the axle free to have backward and forward movement.

In Fig. 7 is disclosed a form of endwise shock spring in which the nuts 34 carried by the forward end of the brace 5 have shock and rebound springs 35 and 36 held against their opposite faces by the spring casing 37 which is secured to the universal joint 9 on the cross bar 10.

Fig. 8 discloses a form in which the bolts are secured to extend rearwardly from the universal joint 9 passing through the bearings 38, 38 formed on the reach 5, and the end of the shock and rebound springs 39 and 40 are mounted on the bolts to bear against opposite faces of the bearings 38 and the tension of these springs is adjustable by nuts 41.

In the form disclosed in Fig. 9 two cross bars 10 and 10ª are secured to the frame with bolts 42, 42 extending between them. A yoke 43 has bearings formed to receive the bolts 42 and shock and rebound springs 44 and 45 are mounted on the bolts on opposite sides of the yoke. With this structure the universal joint 9 is carried by the yoke and the reach 5 is connected therewith.

With the forms of endwise shock springs disclosed in Figs. 10, 11, 12, 13 and 14 the springs are not connected with the reach but are connected with each other in such a manner that the endwise shock springs 45 resiliently oppose the backward and forward movement permitted by the connection of the vertical shock spring with the frame of a vehicle.

In this way it will be seen that I have provided means for driving a vehicle in which the driving axle is mounted to have vertical and longitudinal movement for absorbing the vertical and endwise shocks transmitted thereto by irregularities in the road bed, and at the same time use a dead rear axle which carries load only and has no part in the transmission of power, and it will be understood that the jack shaft may be connected by various other forms of gearing to drive the wheels, and that other slight changes may be made in the form and arrangement of the several parts disclosed, and hence I do not wish to limit myself to the exact arrangement herein set forth.

Having fully described my invention, what I claim as new and desire to secure by Letters Patent is,—

1. The combination with a vehicle frame and axle, of means for resiliently opposing horizontal movement of the axle in either direction, means for keeping the axle square, and a jack shaft carried horizontally by and as a unit with the axle, and transmission means extending from a source of power to the jack shaft.

2. The combination with a vehicle frame and axle, of means between said frame and axle to maintain the axle at right-angles to the frame and yet permit of longitudinal movement of the axle with respect to the frame, spring mechanism for resiliently opposing the movement of the axle in either direction, a jack-shaft carried by said means in driving connection with the drive-wheels on the axle, and transmission means extending from the source of power to the jack-shaft.

3. The combination with a vehicle-frame and axle, of means between said frame and axle to maintain the axle at right-angles to the frame and yet permit of longitudinal movement of the axle with respect to the frame, spring mechanism for resiliently opposing the movement of the axle in either direction, a jack-shaft carried by said means in driving connection with the drive-wheels on the axle, and extensible transmission means extending from the source of power to the jack-shaft.

4. The combination with a vehicle frame, wheels and axle, a reach rigidly attached to the axle and to a fixed point on the frame and permitting movement of the axle lengthwise of the vehicle, a jack-shaft mounted on the reach and in driving connection with the wheels, extensible means connecting the jack-shaft with the source of power, and means forming a part of the connection between the frame and axle to resiliently oppose the movement of the axle lengthwise of the vehicle in either direction.

5. In a motor vehicle in which the rear or drive carrying axle is mounted to have movement endwise with respect to the frame, a reach secured to the axle and having endwise movable connection with the frame, springs connected between the axle and parts moving therewith and the frame to resiliently oppose the endwise movement of the axle in either direction, a jack-shaft journaled on the reach, means connecting the jack-shaft to drive the wheels, and extensible means connecting the jack-shaft with the source of power.

6. In a motor vehicle in which the rear or drive carrying axle is mounted to have movement endwise with respect to the frame, a reach secured to the axle and connected by a universal joint and to have endwise movement with respect to the frame, a spring connection between the reach and frame to resiliently oppose the movement of the axle in either direction, a jack-shaft journaled on the reach, means connecting the jack-shaft to drive the wheels, and extensible means connecting the jack-shaft with the source of power carried by the frame.

7. A motor vehicle in which the rear or drive carrying axle is mounted to have backward and forward movement endwise with respect to the frame, a reach secured to the axle and having back and forth endwise movable connection with the frame, springs connected between the axle and parts moving therewith and the frame to resiliently oppose a backward and forward endwise movement of the axle, a jackshaft journaled on the reach, means connecting the jackshaft to drive the wheels of the vehicles, and extensible means for connecting the jackshaft with the source of power.

In testimony whereof I affix my signature, in the presence of two witnesses.

ROLLAND S. TROTT.

Witnesses:
   CHAS. E. STRATTON,
   B. P. SMITH.